July 28, 1970  D. R. BORGESON  3,522,013

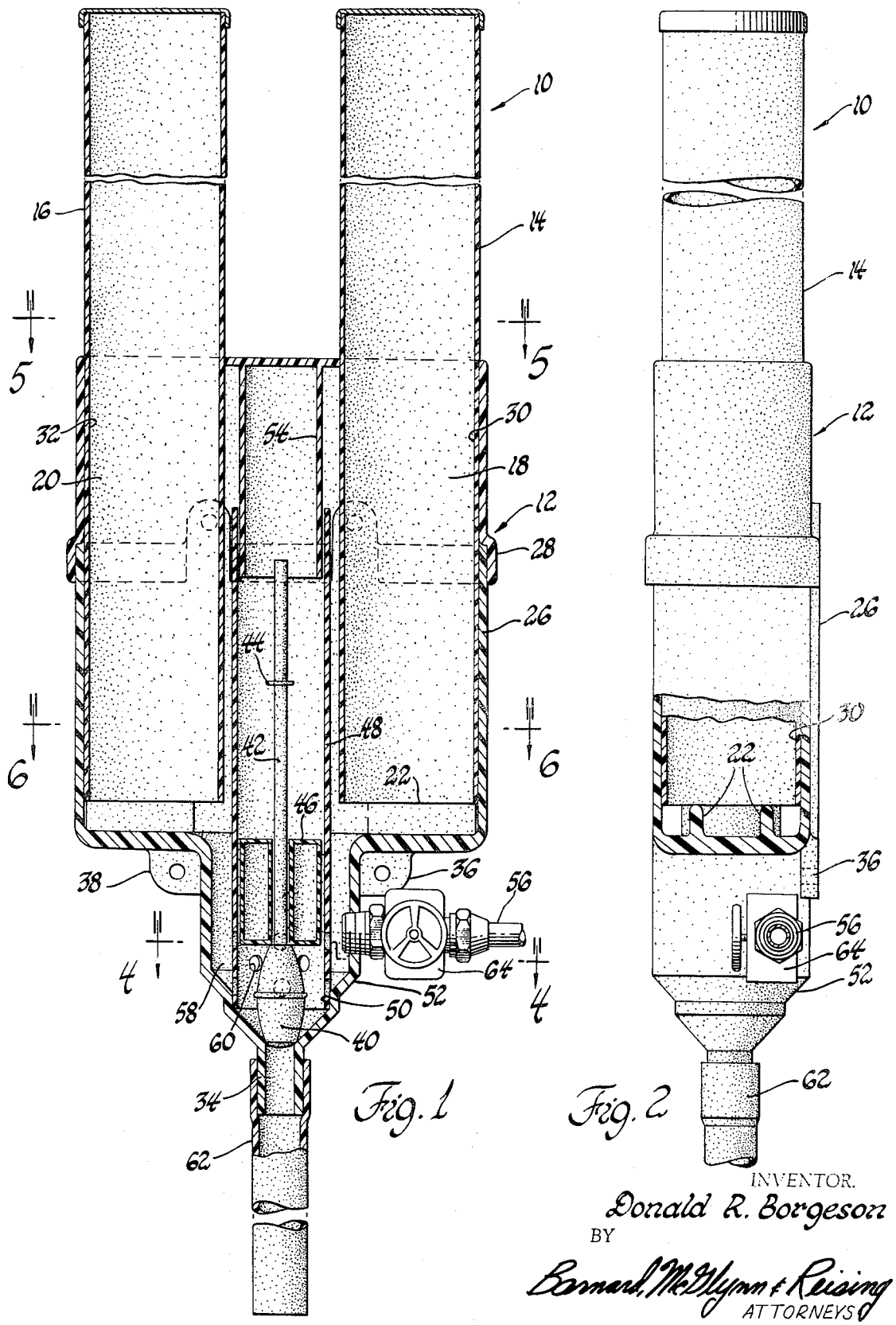

FLUID TREATMENT APPARATUS

Filed July 18, 1968  2 Sheets-Sheet 2

INVENTOR.
Donald R. Borgeson
BY
Barnard, McGlynn & Reising
ATTORNEYS

United States Patent Office 3,522,013
Patented July 28, 1970

3,522,013
FLUID TREATMENT APPARATUS
Donald R. Borgeson, Birmingham, Mich., assignor to Vulcan Laboratories, Inc., Pontiac, Mich., a corporation of Michigan
Filed July 18, 1968, Ser. No. 745,927
Int. Cl. B01f 1/00
U.S. Cl. 23—267                                        8 Claims

ABSTRACT OF THE DISCLOSURE

Fluid treatment apparatus having a chamber in which chemical briquettes are stored with water being intermittently washed over the briquettes to bring about their gradual dissolving and eventual circulation through a water system. A buoyant valve and float arrangement first directs water from an inlet into the chamber to a selected level and then empties the chamber to carry away the dissolved chemicals.

---

The present invention relates to fluid treatment apparatus and, more particularly, to chemical feeders.

It is desirable in certain water circulating systems, for example systems for circulating water for air conditioning systems, to automatically control the dissolution of a chemical or chemicals in the water in order to inhibit scale buildup, corrosion and slime buildup in cooling towers and evaporative condensers. When the water lines of air conditioning systems are in operation over a prolonged period of time, buildup normally occurs inside the piping which cuts down the dimension thereof, and decreases the efficiency of the entire air conditioning system. When natural waters are concentrated by evaporation or heat exchange, the chemical equilibrium of the water is upset and usually calcium forms on vital surfaces. Proper chemical treatment can keep the calcium carbonate in solution thereby preventing the formation of scale. Also, certain water is heavily concentrated with metals and thereby oxides are formed on pipes, and other water contains algae which either forms slime resulting in valving and other important portions of the cooling apparatus becoming blocked or forms a type of wood rot which can deteriorate the metal parts of the cooling system. Proper chemical treatment can overcome the latter two problems also.

Therefore, it is desirable to chemically treat the water used in cooling systems so that the scale formation, corrosion and algae effects are prevented or at least inhibited. It is impractical to route all of the water being used in the aforementioned cooling installations into a chemical feeder both because only a very minimum amount of chemicals are necessary and, in addition, the cost would be very great. Therefore, chemicals of different types are desirably provided which are controllably dissolved, generally by routing only a portion of the water used in the system through a chemical feeder of some type, which automatically, or at frequent definite intervals, delivers a certain amount of chemical into the water sufficient to overcome the aforementioned problems, and this rerouted water is later combined with the remainder of the water to bring about the complete water treatment.

The prior art devices have attempted to solve the problems hereinbefore set forth in various manners. Various types of chemicals must be added to water in a cooling system, and normally the amount of each chemical added must be in a different proportion. Briquetting some chemicals provides a mass that can be gradually dissolved. Some prior art systems are able to dissolve a given chemical at a given rate, but some provision must be made to provide the right ratio of chemicals to prevent tne problem peculiar to the installation involved. It is obvious that water in different parts of the country, for example, has a different water hardness, that is sulphur, calucium, magnesium metals, etc., are contained therein in various amounts. Some systems that provide these chemicals in the appropriate amounts, such as by briquetting can only be manually cycled. Therefore, in addition to a chemical feeder, control mechanisms separate from the chemical feeder itself must be provided for carrying out this cycling automatically. Consequently, if cycled with separate control equipment, overtreatment may be involved or else rather complex control equipment is necessary because, desirably, chemicals are only fed into the water as required. It is also true in water circulating systems, such as those common to air conditioning systems, that the circulating systems for the water is not in operation at all times. Therefore, it is a waste of chemicals if the fluid control apparatus involved for treating the water functions strictly on a time basis because the cycling may take place when the apparatus is not operating. Some automatic systems found in the prior art function strictly on a time basis and, consequently, chemicals are being dissolved during a time when the system is not operating which causes an overconcentrated solution and hence waste.

Other prior art devices automatically treat water in installations such as air conditioning systems by utilizing only a portion of the water used for circulation and only when circulating, but retain some of the problems of properly distributing the chemicals. A device such as shown in Fredericks U.S. Pat. 3,107,156, which teaches an automatic water treatment system utilizing briquettes but necessarily dissolves a particular type of briquette completely before the succeeding briquette is fed into a position where it can be dissolved. In addition, these systems must have a very careful pressure control for the inlet water so that a jet stream into the chemicals to be dissolved is not generated which would cause wasteful overtreatment. In addition, metal parts are involved in the system as well as flow adjustment controls, which necessarily diminishes the effectiveness of the unit described.

The present invention contemplates the solution to the aforementioned problem by providing a fluid treatment apparatus including a tank with an inlet and an outlet. Valve means is provided which is movable between open and closed positions for controlling fluid flow through the outlet, and float means for moving the valve means to the open position so that the tank will repeatedly fill and empty, the float means being movable relative to the valve means. A significant feature of the above-mentioned device is that the valve means is buoyant, and the entire apparatus is made of plastic. The valve means and float means move separately as the valve means assumes an open position, but the float means and valve means move in unison as the valve means moves towards the closed position. This is primarily due to the fact that the float means is slidable on the valve means. Additionally, a tubular member supported in said tank is adapted to guide the float means in its movement and provides a floatation chamber for the float means. The tank is desirably situated above the valve means and forms a support for matter that is to be gradually dissolved as fluid is cycled into and from the tank by the valve means. The outlet should have a capacity to discharge fluid that exceeds the rate of flow of the fluid under gravity from the tank plus the flow from the inlet. Another feature of the above-described device is that the valve means includes a buoyant member that seats in the outlet and an elongated member extends therefrom. A stop means is slidably and adjustably disposed on the elongated member and regulates the distance that the float means slides thereon. A sufficient head of fluid is established in the tank to allow the float means to move in the area as established by the stop means so that the buoyant member opens the outlet only after a predetermined level in the tank is reached which is sufficiently high to cover the desired number of chemical briquettes stored therein and wash fluid thereacross during the cycling of the apparatus.

Accordingly, it is an object of the present invention to provide improved fluid treatment apparatus including a tank and an outlet, the apparatus comprising valve means movable between open and closed positions for controlling fluid flow through the outlet, and float means for moving the valve means to the open position so that the tank will repeatedly fill and empty, the float means being movable relative to the valve means.

It is another object of the present invention to provide improved fluid treatment apparatus according to the previous object wherein the valve means is buoyant.

It is still another object of the present invention to provide fluid treatment apparatus wherein valve means and float means are provided to selectively open an outlet, the valve and float means moving separately as the valve means assumes an open position, the float means and valve means moving in unison as the valve means moves towards a closed position.

It is a further object of the present invention to provide improved fluid treatment apparatus that is entirely composed of plastic material.

It is still a further object of the present invention to provide improved fluid treatment apparatus for regulating fluid flow between an inlet and outlet of a tank, the apparatus comprising valve means movable into and out of sealing engagement with an outlet, and float means slidably carried by the valve means and responding to a predetermined fluid level in the tank to draw the valve means out of sealing engagement with the outlet thereby cycling fluid across chemicals which are to be gradually dissolved.

Other objects and attendant advantages of the present invention will be readily appreciated as the same becomes better understood by reference to the following detailed description when considered in connection with the accompanying drawings wherein:

FIG. 1 is a sectional view of the subject matter of the present invention shown in section, the valve means illustrated in the closed position;

FIG. 2 is a side elevation of the subject device with certain portions shown in section;

Figure 3:
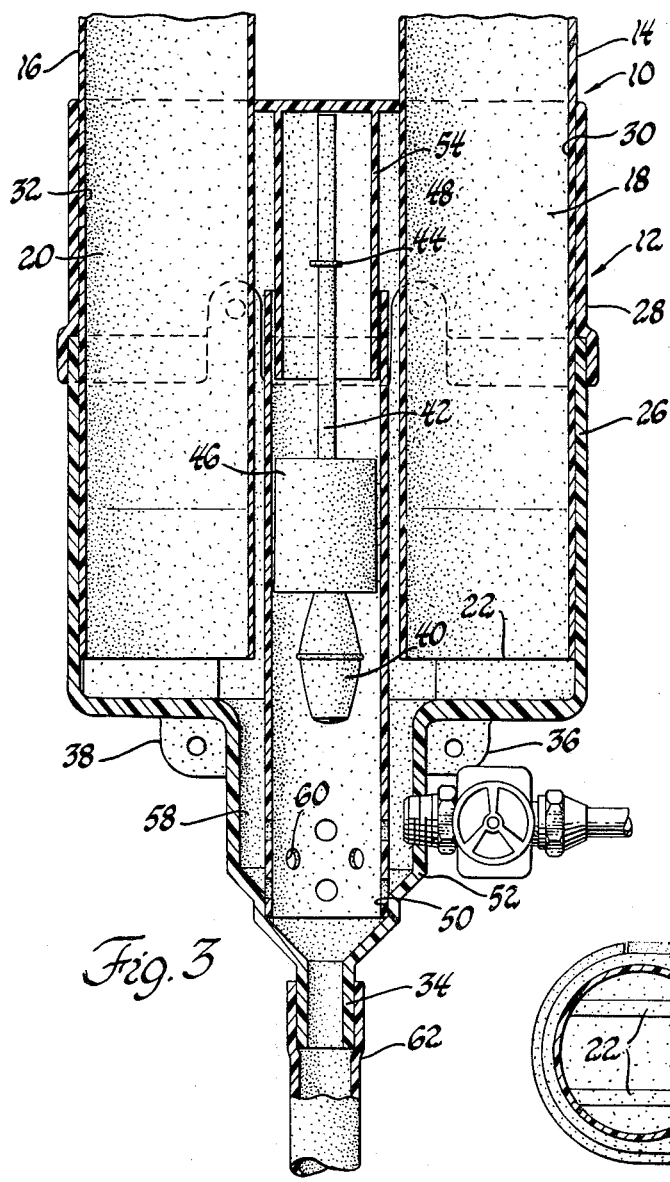
FIG. 3 is a sectional view of the device shown in FIG. 1, the valve means illustrated in the open position.
Figure 4:
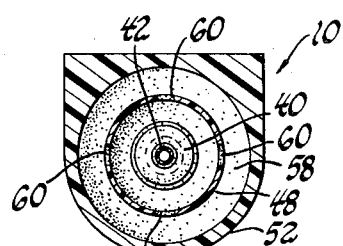
FIG. 4 is a sectional view taken along line 4—4 of FIG. 1.

Referring to FIG. 1, the fluid treatment apparatus 10 is shown. A tank 12 supports columniated tubes or cartridge members 14 and 16 which store material that is to be dissolved, preferably in the form of briquettes in areas 18 and 20 respectively. Support ridges 22 support the briquettes and the lower open ends of the tubes 14 and 16 above the lower edge or bottom of the tank 12 so that water can circulate therearound to allow the gradual dissolving thereof as the water is washed in and out of tank 12 in a manner to be hereinafter described.

Tank 12 includes an upper portion 26 adapted to receive a cap or cover 28 which has apertures or openings 30 and 32 therein adapted to receive cartridge members 14 and 16. Members 14 and 16 are vertically disposed with respect to outlet 34 so that fluid in tank 12 normally flows by gravity to outlet 34 while the valve means is cycled. Mounting brackets 36 and 38 are integrally formed with lower portion 26 and adapt the entire assembly to be mounted to a fixed structure.

Figure 5:
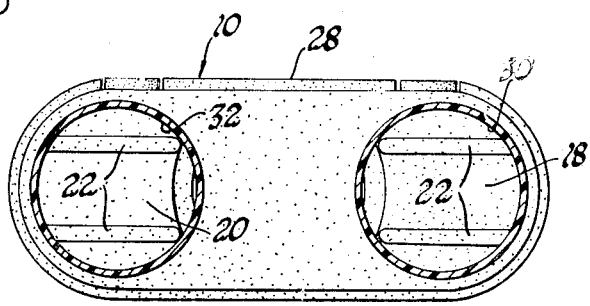
FIG. 5 is a sectional view taken along line 5—5 of FIG. 1.
Figure 6:
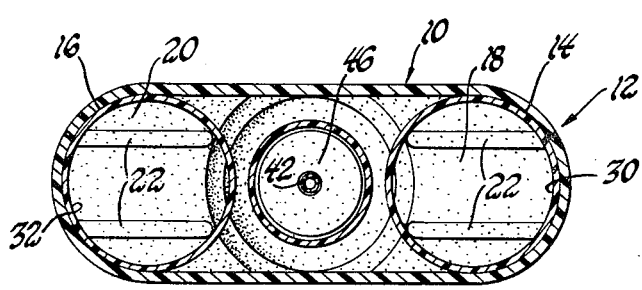
FIG. 6 is a sectional view taken along line 6—6 of FIG. 1.

The relationship of members 14 and 16 to cap 28 is better seen in FIG. 5, with support ridges 22 also clearly shown therein.

Referring to FIG. 1, buoyant valve member 40, elongated member or rod 42 and stop means 44 collectively form a valve means as herein presented. Float means 46 is slidable on elongated member 42 and is likewise buoyant. The range of movement of float member 46 is limited by buoyant valve member 40 and the adjusted position of stop means 44, it being understood that stop means 44 can take the form of a spring washer adapted to be moved to different longitudinal positions along the elongated member 42. The float means 46 is guided in its translational or vertical movement by tubular member 48 situated between flange 50 of a valve housing 52 and downwardly extending tubular extension 54 integrally formed with coacts with or fits over and holds in place the tubular member 48. It is understood that valve housing 52 is a lower extension from the main body or upper portion 26 of tank 12 and defines a chamber 58 in fluid communication therewith.

Inlet 56 communicates with a source of fluid and expels this fluid into valve housing 52, more specifically chamber 58 thereof. Chamber 58 extends completely around tubular member 48 which has apertures 60 therein to allow the free communication of fluid from chamber 58 to the center portion of tubular member which serves as a flotation chamber for float means 46. It is understood that the apertures 60 provide sufficient opening from chamber 58 into the center of tubular member 48 so that the water will rise in tank 12 and chamber 58 at an even rate.

In operation, when the subject fluid treatment apparatus is used in the environment of an air conditioning fluid circulating system, water enters inlet 56. FIG. 1 illustrates the subject apparatus with the parts in the position they assume when outlet 34 is sealed and tank 12 has been emptied with a new cycle about to begin. Water from inlet 56 enters chamber 58 and simultaneously passes through apertures 60 of tubular member 48 and rises in chamber 58.

Float means 46 is extremely buoyant and follows the water level as it rises in the flotation chamber or center of tubular member 48. Eventually float means 46 contacts stop means 44 and exerts a force thereagainst. However, when the water level has risen this high in tank 12, there is a sufficient water head to hold buoyant member 40 on its seat blocking outlet 34. While this condition exists, float means 46 will become partially submerged until the water level reaches a point where the buoyancy of float means 46 overcomes the pressure of the water head holding buoyant member 40 on its seat. When this occurs, buoyant member 40 will be drawn off its seat against outlet 34 and will rise very rapidly into contact with float means 46 as shown in FIG. 3.

With buoyant member 40 in an engagement with float means 46, they will recede together along with the water level in tank 12. Due to their buoyancy, the water level will recede well into chamber 58 before buoyant member 40 again contacts outlet 34 and seats thereagainst. It is understood that the opening in outlet 34 is sufficient to accommodate both the water continuing to flow in through inlet 56 and the water exiting from tank 12.

With buoyant member 40 again on its seat, the configuration of parts as seen in FIG. 1 is duplicated and another cycle begins. It should be understood that the exact water level in tank 12 is controlled in a given installation so that a sufficient submerging of the briquettes stored in columniated members 14 and 16 is realized. As previously stated, a single type of briquette may be situated therein, or several different types, so that the proper amount of water treatment desired is carried out. The alternate cycling of the water levels above and below the briquettes to be dissolved, will cause a washing on the surface thereof and a gradual dissolving. This gradual dissolving is related in the dsign of the subject device so that for a given amount of water through inlet 56, a desired amount of chemical dissolution takes place.

It should also be noted that when the fluid treatment apparatus, as seen in FIG. 1, is in the static or unfilled state, the water level in tank 12 has receded into chamber 58. This means that the briquettes situated above support ridges 22 are not submerged in water at the time that the system has finished its cycle and, therefore, the concentration of fluid in chamber 58 will remain constant until the next cycle begins. In the particular installation of an air conditioning water circulating system, it should be further understood that inlet 56 is connected to that water circulating system, but all of the water circulating in that system does not pass through inlet 56. Therefore, only when the water circulating system of the air conditioning system, previously mentioned, is operated, cycling of the fluid treatement apparatus, herein described, will take place. However, when the circulating system of the air conditioning system is not operating, cycling herein described will not take place and the system will automatically go back to the situation where float means 46 and buoyant member 40 are situated on the lowest portion of tubular member 48. The consequence of this situation is that no waste occurs in the chemicals stored in columniated members 14 and 16. The plastic construction of these columniated members allows a visual sighting from the outside thereof to determine the exact extent of chemical material yet remaining so that the chemicals can be replenished as required.

Another significant feature of the subject invention is that the environment in which the subject fluid treatment apparatus is used is chemically adverse, and all of the parts of the invention are composed of plastic. The system is designed in such a way that all of the valving can be composed of plastic without any special structural problems being taken into account and further, the chemicals that are used in such an installation are sometimes damaging in concentrated form in a metallic container. In addition, the plastic composition allows for a very economical manufacture which further extends the utility of the subject device. Typically, float means 46 can be composed of any well known expanded foam type plastic while buoyant member 40 can be likewise constructed or can be a hollow type bulb with an elongated member 42 being preferably in tubular form to reduce the weight thereof. Tube 62 which forms a return to the water circulating system of the air conditioning apparatus, can likewise be of plastic to extend the imperviousness of the system to the chemicals used or can be of metal construction with an approriate fitting provided at outlet 34 as desired.

It is understood that the fluid treatment apparatus herein disclosed while described in the environment of an air conditioning system, can be used in any environment such as a water air conditioning system or air washer system where chemical dissolution is appropriate. For example, in water softening apparatus, salt must be dissolved either at the time that the recycling of the water softening equipment takes place or gradually as the household water system is in operation. The water softening environment is much less complex and offers fewer problems than the air conditioning environment because the various chemicals needed to properly service an air conditioning system increase the scope of the problem. Therefore, in the water softening environment, the subject apparatus is equally as efficient and overcomes many of the problems normally associated with water softening systems, namely their high cost and the intricacy of the valving necessary in order to maintain the proper functioning thereof.

An inlet valve means 64 is also seen in FIG. 1 and its function is to control the amount of water flow into chamber 58. Ordinarily, the valve 64 is set once in a given installation to establish a desired flow of fluid into the tank 12 so that the valve means will cycle properly. It is understood that the pressure of fluid available in different locales varies, so some initial adjustment may be necessary at the time the apparatus herein described is installed.

The invention has been described in an illustrative manner and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the present invention in which an exclusive property or privilege is claimed are defined as follows:

1. A fluid treatment apparatus comprising: a tank, an outlet through the bottom of said tank, support means in said tank above and laterally of said outlet for supporting material to be dissolved, an inlet into said tank, a buoyant valve member disposed above and coacting with said outlet to selectively prevent flow therethrough, float means operatively connected to said valve member for a predetermined amount of movement upwardly before exerting a force due to buoyancy upon said valve member to remove said valve member from said outlet, guide means extending substantially vertically upwardly from said outlet and disposed about said float means and said valve member to guide the vertical movement of said float means and said valve member for limiting lateral movement thereof, said guide means having at least one aperture therethrough to provide liquid communication between the tank and the outlet.

2. An apparatus as set forth in claim 1 including an elongated member extending upwardly from said valve member, said float means being slidably disposed on said elongated member, and stop means adjustably carried by said elongated member for limiting movement of said float means therealong.

3. An apparatus as set forth in claim 1 wherein said guide means comprises a tubular member having apertures therethrough.

4. An apparatus as set forth in claim 3 wherein said tank includes an upper portion and a chamber extending downwardly therefrom, said support means being disposed in said upper portion on either side of said chamber for supporting elongated vertically extending cartridge members containing material to be dissolved.

5. An apparatus as set forth in claim 4 wherein the lower end of said tubular member is supported in said chamber, said outlet being disposed at the bottom of said chamber.

6. An apparatus as set forth in claim 5 including an elongated member extending upwardly from said valve member, said float means being slidably disposed on said elongated member, stop means for limiting upward movement of said float means along said elongated member.

7. An apparatus as set forth in claim 6 including means coacting with the upper end of said tubular member to limit lateral movement thereof.

8. A fluid treatment apparatus comprising: a tank having an upper portion and a chamber extending downwardly therefrom; support means disposed in said upper portion of said tank on opposite sides of and above said chamber for supporting the lower open ends of elongated cartridge members containing material to be dissolved; said support means being adapted to support the cartridge members above and spaced from the bottom of said upper portion of said tank so that fluid may contact material in the cartridge members; a cover supported by said upper portion of said tank and having openings therein to allow cartridge members to extend therethrough; a tubular member having a lower end supported in said chamber and extending upwardly through said tank; said cover including a downwardly extending extension coacting with said tubular member to maintain the latter in position; an inlet into said chamber below said support means; an outlet at the bottom of said chamber; a buoyant valve member for coacting with said outlet to prevent flow therethrough; an elongated member extending upwardly from said valve member within said tubular member; float means slidably disposed on said elongated member; and stop means on said elongated member for limiting sliding movement of said float means upwardly along said elongated member; said tubular member having apertures therethrough for allowing fluid to flow therethrough.

References Cited

UNITED STATES PATENTS

| | | | |
|---|---|---|---|
| 785,682 | 3/1905 | Quinn | 137—397 |
| 976,870 | 11/1910 | Guyton | 137—397 |
| 1,065,899 | 6/1913 | Guyton | 137—397 |
| 2,825,908 | 3/1958 | Tucker | 4—56 |
| 3,005,206 | 10/1961 | Dollinger | 4—56 |
| 2,904,062 | 9/1959 | Techler | 137—397 X |
| 3,094,134 | 6/1963 | Currie | 23—267 X |
| 3,107,156 | 10/1963 | Fredericks | 23—311 X |
| 3,185,302 | 5/1965 | Kryzer | 210—126 |
| 3,190,726 | 6/1965 | Rudelick | 23—272 X |
| 3,374,891 | 3/1968 | Buchmann | 210—126 |

FOREIGN PATENTS 760,965  5/1953  Germany.

NORMAN YUDKOFF, Primary Examiner

S. J. EMERY, Assistant Examiner

U.S. Cl. X.R.

23—311; 210—176; 4—101; 137—397, 417, 423, 430